Figure 1:
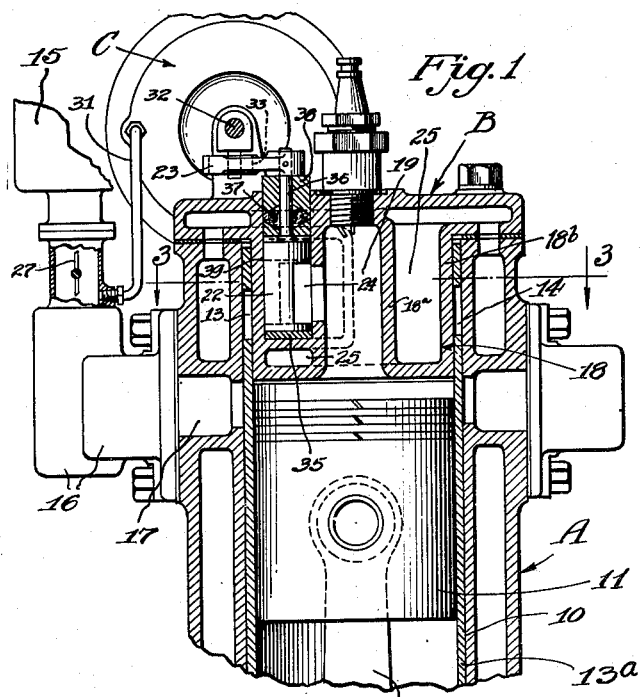

Sept. 28, 1937.     R. N. DU BOIS     2,094,266

ENGINE

Filed Jan. 18, 1932

INVENTOR.

Ralph N. DuBois

BY

ATTORNEY.

Patented Sept. 28, 1937

2,094,266

UNITED STATES PATENT OFFICE 2,094,266

ENGINE

Ralph N. Du Bois, Grosse Pointe Farms, Mich., assignor to Continental Motors Corporation, Detroit, Mich., a corporation of Virginia Application January 18, 1932, Serial No. 587,270

5 Claims. (Cl. 123—48)

My invention relates to internal combustion engines and has among its objects the provision of improvements for increasing the efficiency of the engine.

My aforesaid invention relates particularly to engines having cylinder heads which extend within the outer ends of the cylinders such as commonly employed in the general class of sleeve valve engines as distinguished from poppet valve engines. My invention is an improvement over, and a further application of, my invention described and claimed in my co-pending application, Serial No. 586,505 filed Jan. 14, 1932.

It is customary in engine design to provide a fixed compression volume or compression ratio determined by conditions of engine operation at maximum load, torque, or wide open throttle setting. Under such conditions the engine is receiving its maximum quantity of the charge, such as carbureted gasoline and air, and the compression pressure is the maximum obtainable without objectionable combustion knock and detonation. With such structures, it is apparent that as the engine is operated under reduced load, or reduced torque and partially closed intake throttle, there is a lesser quantity of the charge passing to the engine with a corresponding lesser compression pressure and a corresponding falling off in the efficiency of the engine. In other words, by designing the engine for maximum efficiency at wide open throttle, the engine is not operating at maximum efficiency under conditions of partially open throttle where the compression space could be materially reduced and the compression ratio thus increased without resulting in knocking and detonation.

Where the engine is used for propelling a motor vehicle, it is usually operating most of the time under conditions of part load and thus is not developing its maximum efficiency.

It is a further object of my invention to provide improved means and methods for varying the compression ratio of the engine whereby to substantially maintain a constant compression pressure over the range of engine performance and thereby materially increase the efficiency of the engine, especially at part throttle operation.

In carrying out my invention I have provided valve controlled means for progressively adding volume to the compression space as the engine torque increases. Thus in the specific embodiment as in cases where the engine is operated under substantially constant loads, when the engine throttle valve is opened, the manifold pressure increases and acts on a diaphragm to actuate the valve which controls the compression volume. As the throttle valve opening decreases the compression volume is reduced. For practical purposes, the objects of my invention are accomplished by varying the compression volume in stages or in increments although if desired the variation may be accomplished in infinite stages of compression volume variation. In my illustration I have disclosed three stages or conditions of compression volume which provide for substantially uniform compression pressure although it will be understood that the number of volume increments may be varied as desired.

A further object of my invention resides in the provision of a valve for controlling the variation in compression ratio, such valve lending itself to ready operation or adjustment without having to materially oppose the pressures being developed in the combustion chamber, said valve preferably simultaneously controlling variation of the compression volumes of a plurality of cylinders.

A still further object of my invention resides in my novel compression pressure control for an engine having a combustion chamber construction capable of being formed of relatively small volume, such as may be provided in sleeve valve engines wherein the combustion chamber need not be enlarged unduly to provide clearance for valves such as necessitated by poppet valve engines. Thus, in the general type of engine illustrated, my invention may be utilized to the maximum extent.

Figure 2:
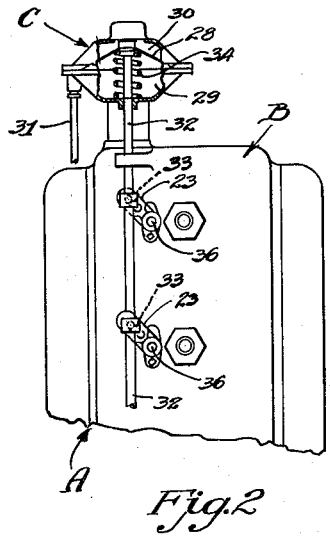
Figure 3:
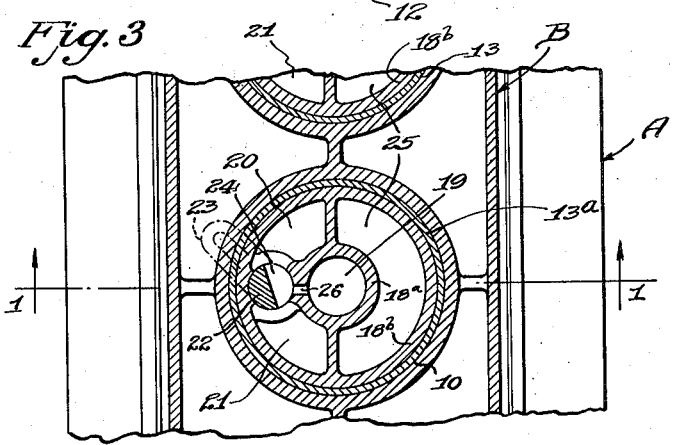
Figures 4, 5:
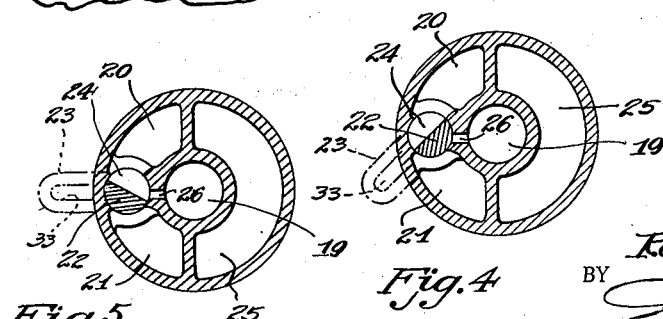

Further objects and advantages of my invention reside in the novel combination and arrangement of parts more particularly hereinafter described and claimed, reference being had to the accompanying drawing in which:

Fig. 1 is a sectional elevation view through a typical cylinder of the engine, on the line 1—1 of Fig. 3, Fig. 2 is a plan view of one end of the engine showing the diaphragm control, Fig. 3 is a sectional view of one of the engine cylinders along the line 3—3 of Fig. 1 showing the main and auxiliary chambers in communication for maximum load or torque and relatively low compression ratio, Fig. 4 is a generally similar view of the cylinder head parts showing the main and auxiliary chambers out of communication for small load or torque and relatively high compression ratio, and Fig. 5 is a view similar to Fig. 4 showing the main chamber and one of the auxiliary chambers in communication for part load or torque and a corresponding intermediate compression ratio.

In the drawing, reference character A represents the engine cylinder block having the usual aligned cylinder bores 10, one of which is shown in Figs. 1 and 3. Within each cylinder is a piston 11 of usual construction adapted to actuate the usual crankshaft (not shown) by reason of the usual connecting rod 12. I have illustrated my invention as a cylinder head attachment for the sleeve valve type of engine although it will be understood that other types of valves and valve arrangements may be used with the principles of my invention. Thus I have shown a sleeve valve 13ª of the well known combined movement type operable between the cylinder 10 and piston 11, said valve having the usual intake and exhaust ports 13 and 14 respectively for controlling passage of carbureted gasoline and air from carburetor 15 to intake manifold 16 and the various cylinder block intake passages 17 respectively communicating with the sleeve intake ports 13 of engine cylinders. The sleeve valves are operated in the usual manner by a valve shaft (not shown) driven at half crankshaft speed for the usual four-stroke cycle engine.

B represents my cylinder head construction which is adapted to close one end of cylinders 10. This cylinder head is formed with a portion 18 depending or extending within each cylinder. The compression space for each cylinder is largely provided by a main combustion chamber 19 overlying the face of piston 11 and by one or more auxiliary chambers, there being two in the accompanying illustration designated at 20 and 21. The main combustion chamber is controlled in its communication with its auxiliary chambers by a valve means herein illustrated as an oscillating valve 22, one of these valves preferably extending axially of the cylinder head structure B and cylinder 10 for association with each of the various chambers of the respective cylinders. Each valve 22 is provided with an actuating arm 23 whereby oscillating movement may be imparted to the valve from a point without the engine structure. The valve 22 at each cylinder is provided with a passage 24 controlling communication between the main combustion chamber 19 and auxiliary chambers 20 and 21. The passage or port 24 is preferably arranged so as to first place chambers 20 in communication with chamber 19 and thereafter place chamber 21 in communication with chamber 19 as will be later apparent. In the position of parts illustrated in Fig. 5 the chamber 20 is illustrated as being in communication with chamber 19 and chamber 21 is closed from communication with chamber 19. The auxiliary chambers 20 and 21 are formed as arcuate projections or closed extensions concentrically of chamber 19 and are preferably substantially surrounded by the water jacket 25 forming a part of the cooling system of the cylinder head whereby the auxiliary chambers are cooled together with valve 22. A passage 26 forms a communication between the main combustion chamber 19 and the passage 24 of valve 22. Thus, inner wall 18ª of the depending portion 18 is surrounded by outer wall 18ᵇ, the space therebetween being occupied by cooling water and the auxiliary chambers 20 and 21.

The usual throttle valve 27 is provided for controlling the amount of fuel mixture supplied to the engine in the usual manner by the usual hand throttle or accelerator pedal (not shown) where the engine is mounted in a motor vehicle. C represents a diaphragm housing which contains a diaphragm 28 dividing casing C into chambers 29 and 30. The chamber 29 is open to intake manifold 16 by reason of the pipe or conduit 31 whereby conditions of pressure in the intake manifold will act on diaphragm 28. Secured to the diaphragm is a rod 32 connected to the various arms 23, the latter each having a slot 33 permitting the arm to oscillate without binding with the rod. A spring 34 may be provided to assist in the operation of the actuating rod 32 and valve 22 when the manifold suction pressure is decreased. Each valve 22 has a seat of graphite 35 and each valve has a stem 36 for operation of the valve by arm 23. A packing 37 and gland 38 prevent leakage of exhaust gas axially outwardly of the cylindrical valve containing recess 39.

In operation, with the engine operating under relatively light load or low torque, the throttle valve 27 will be nearly closed, thereby producing a partial vacuum or condition of relatively low pressure in manifold 16 and chamber 29 causing diaphragm 28 to compress spring 34 and move arm 23 to the position shown in Fig. 4. This movement causes the arm 23 to move or rock valve 22 whereby passage 24 is moved away from passage 26 to close communication between the main chamber 19 and the auxiliary chambers 20 and 21. In this condition of operation the compression space of the engine consists in the relatively small volume provided by the main combustion chamber 19 and provides a relatively high compression ratio. The term compression ratio is well known in the art and is the ratio of the piston displacement plus combustion chamber volume to the combustion chamber volume. As a feature of my invention this compression ratio is relatively high or in other words the compression volume is relatively small, thereby materially increasing the efficiency of the engine. It is of course important in order to realize the maximum benefits of my invention to maintain the main chamber 19 as small as possible within the limits that avoid combustion knock and detonation for the conditions of minimum throttle opening. It is not beyond possibility for such conditions to employ a compression ratio of 14:1 for such conditions thereby increasing fuel economy over generally established fuel consumption in customary engines in similar conditions of load.

As the load or torque increases as produced by movement of the throttle valve 27 to the position where it is substantially half open, the pressure in manifold 16 and chamber 29 increases causing diaphragm 28 assisted by spring 34 to actuate or move the valve 22 to the position shown in Fig. 5, thereby placing passage 26 in communication between the main chamber 19 and auxiliary chamber 20 so as to increase the compression space and thereby lower the compression ratio. Under such conditions of operation it is not unusual to operate the engine with a compression ratio of approximately 9:1 which will afford improved fuel economy over conventional engines operating under similar load conditions though to a lesser degree than when the engine is operated with a compression ratio of 14:1.

As the throttle valve 27 is further opened from the position corresponding to Fig. 5 to the position illustrated in Fig. 1, the corresponding increase in pressure in manifold 16 causes diapragm 28 to actuate arm 23 so as to bring passage 26 in communication between the main combustion chamber 19 and auxiliary chamber 21, the auxiliary chamber 20 remaining in communication with the main combustion chamber. Under such conditions of operation, the engine now has its maximum compression volume and its minimum compression ratio corresponding in general to values ordinarily employed in conventional engines over the entire range of load conditions. Under such conditions, the compression ratio may be somewhere in the neighborhood of 5:1 or 6:1 and the valve does not in this position add to the efficiency of the engine.

By reason of my invention it will be apparent that I have provided for a progressively increasing compression ratio as the engine load or torque decreases whereby the compression pressure is maintained substantially constant, it being understood that the number of increments of volume changes which are employed will determine the degree to which the compression pressure variation approaches a true constant value. For practical purposes I have divided these increments into the three stages consisting of main combustion chamber 19 for low throttle condition, then the addition of one auxiliary chamber for part throttle condition, and finally the addition of a second auxiliary chamber for full open throttle condition.

My invention has particular significance in materially increasing engine efficiency for part throttle operation inasmuch as many engines are operated under conditions of part throttle for the majority of time. For example, where the engine is used to propel a motor vehicle the operator is driving the car at part throttle most of the time and it is therefore in this range of operation that engine efficiency is very important.

I wish it understood that reference herein to specific values of compression ratios and the like are merely for illustrative purposes since these may be varied as desired and may be greater or less than indicated herein depending upon the extent of realizing the maximum benefits which may be derived from my invention. As a further illustration, in the case of an engine having a sleeve valve of 3⅛" bore and a piston of 4" stroke, it is apparent that the piston displacement will be 30.3 cu. inches. With a 5:1 compression ratio under conditions of maximum load or maximum torque the total volume of the main and auxiliary chambers will be 7.7 cu. inches. Under conditions of approximately one-half load, a compression ratio of 9:1 will result in a total compression volume 3.85 cu. inches, this being the combined volume of the main combustion chamber and one of the auxiliary chambers. Under conditions of light load or low torque where the auxiliary chambers are closed, a compression ratio of 14:1 will result in a volume of 2.36 cu. inches for the main combustion chamber 19.

The valve 22 is preferably arranged on the intake side of the engine as illustrated whereby it is maintained in a relatively cool condition. It will also be noted that the compression space formed between piston 11 and cylinder head structure B lies above the piston, as distinguished from the customary arrangement to one side of the cylinder for L-head engines as generally illustrated in my co-pending application aforesaid.

What I claim as my invention is:

1. In an internal combustion engine, a cylinder, a piston, sleeve valve means associated with said cylinder, a cylinder head structure depending within said cylinder and formed with a main combustion chamber, the depending portion of said cylinder head structure having an auxiliary chamber lying substantially within the cylinder, and a valve controlling communication between said chambers, said auxiliary chamber lying between said cylinder wall and said main combustion chamber.

2. In an internal combustion engine, a cylinder, a piston, sleeve valve means associated with said cylinder, a cylinder head structure depending within said cylinder and formed with a main combustion chamber lying substantially within the cylinder, said cylinder head structure having an auxiliary chamber lying substantially within the cylinder, and a valve controlling communication between said chambers, said auxiliary chamber partially surrounding said main combustion chamber.

3. In an internal combustion engine, a cylinder, a piston, sleeve valve means associated with said cylinder, a cylinder head structure depending within said cylinder and formed with a main combustion chamber, said cylinder head structure having a plurality of auxiliary chambers lying substantially within the cylinder, and valve means controlling communication between said main chamber and said auxiliary chambers.

4. A cylinder head structure for internal combustion engines, said structure having an inner wall forming a main combustion chamber, an outer wall surrounding the inner wall and spaced therefrom, and an auxiliary chamber formed in said space.

5. In an engine, a cylinder, a piston, sleeve valve means associated with said cylinder, and a cylinder head structure for closing the outer open end of the cylinder and provided with a re-entrant portion extending inwardly of the cylinder and spaced from the walls thereof to provide a pocket accommodating said sleeve valve means, said re-entrant portion having an inner wall forming a main combustion chamber and an outer wall surrounding the inner wall and spaced therefrom to provide a cooling jacket surrounding the main combustion space, said re-entrant portion having webs connecting said inner and outer walls and forming one or more auxiliary chambers, said cooling jacket extending beneath said auxiliary chamber or chambers.

RALPH N. DU BOIS.